US012773069B2

(12) United States Patent
Pressman et al.

(10) Patent No.: US 12,773,069 B2
(45) Date of Patent: *Oct. 27, 2026

(54) GRILL COVER ASSEMBLY

(71) Applicant: Grill Hoodie LLC, Palm Desert, CA (US)

(72) Inventors: Eugene Jules Pressman, Palm Desert, CA (US); Ryan Keil, Layton, UT (US)

(73) Assignee: Grill Hoodie LLC, Palm Desert, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 17/685,490

(22) Filed: Mar. 3, 2022

(65) Prior Publication Data

US 2022/0354304 A1 Nov. 10, 2022

Related U.S. Application Data

(63) Continuation of application No. 17/541,333, filed on Dec. 3, 2021, now Pat. No. 11,297,978.

(60) Provisional application No. 63/147,134, filed on Feb. 8, 2021.

(51) Int. Cl.
*A47J 37/07* (2006.01)

(52) U.S. Cl.
CPC ................................ *A47J 37/0786* (2013.01)

(58) Field of Classification Search
CPC .......................... A47J 37/0704; A47J 37/0786
See application file for complete search history.

(56) References Cited

U.S. PATENT DOCUMENTS

| | | | | | |
|---|---|---|---|---|---|
| 554,066 | A * | 2/1896 | Jager | A41D 27/22 | 2/271 |
| 2,097,923 | A | 11/1937 | Hutchinson | | |
| 2,995,137 | A | 8/1961 | Cothem | | |
| 3,454,075 | A * | 7/1969 | Weinstein | B41J 29/13 | 312/208.3 |
| 4,335,915 | A * | 6/1982 | Knapp | B60J 7/102 | 24/369 |
| 4,834,128 | A * | 5/1989 | Burgess | B60J 11/02 | 135/117 |
| 5,275,463 | A | 1/1994 | Rocha | | |
| D377,136 | S | 1/1997 | Knuth | | |
| 6,328,083 | B1 | 12/2001 | Esterson et al. | | |
| 6,863,100 | B2 | 3/2005 | Neal et al. | | |
| 6,922,033 | B2 | 7/2005 | Ziegenhorn et al. | | |
| 7,594,695 | B2 * | 9/2009 | Noonan | A47C 31/113 | 297/184.11 |

(Continued)

FOREIGN PATENT DOCUMENTS

| | | | | | |
|---|---|---|---|---|---|
| FR | 2955757 | A1 * | 8/2011 | A47C 31/11 |
| GB | 907346 | A * | 10/1962 | |
| JP | H1159198 | A * | 3/1999 | |

*Primary Examiner* — Michael G Hoang
*Assistant Examiner* — Logan P Jones
(74) *Attorney, Agent, or Firm* — Carlson, Gaskey & Olds, P.C.

(57) ABSTRACT

In some aspects, the techniques described herein relate to an assembly configured to cover a barbecue grill, including a cover including an upper section and a lower section, wherein the upper section is configured to selectively cover and uncover a hood of the barbecue grill, wherein an inner surface of the upper section includes a loop; a stand including a hook, wherein the hook is configured to hold the loop such that the stand supports the upper section.

17 Claims, 9 Drawing Sheets

(56) References Cited

U.S. PATENT DOCUMENTS

| | | | | |
|---|---|---|---|---|
| 7,867,409 | B2 | 1/2011 | Brcka | |
| 8,544,521 | B2 | 10/2013 | Lieze, Jr. et al. | |
| 8,701,652 | B2 | 4/2014 | Cross | |
| 9,370,277 | B2 | 6/2016 | Weaver | |
| 9,468,337 | B2 | 10/2016 | Simon et al. | |
| 9,596,958 | B1 * | 3/2017 | Murphy | A47J 37/0786 |
| 2002/0157696 | A1 | 10/2002 | O'Brien | |
| 2005/0066957 | A1 * | 3/2005 | MacLean | A47J 37/0786 126/41 R |
| 2009/0223547 | A1 * | 9/2009 | Schneider | E04H 15/02 135/94 |
| 2009/0236019 | A1 * | 9/2009 | Maruzzo | A47J 37/0786 150/154 |
| 2013/0062025 | A1 * | 3/2013 | Bromberek | B65D 90/06 160/242 |
| 2014/0048189 | A1 * | 2/2014 | Cornew | E04H 6/025 150/166 |
| 2014/0290812 | A1 * | 10/2014 | Chaplin | A47J 37/0786 150/165 |
| 2015/0075684 | A1 * | 3/2015 | Simon | A47J 37/0786 150/165 |
| 2020/0022532 | A1 | 1/2020 | Atalla | |
| 2020/0046167 | A1 | 2/2020 | Atalla | |

* cited by examiner

GRILL COVER ASSEMBLY

RELATED APPLICATIONS

This application is a continuation of prior U.S. application Ser. No. 17/541,333, filed Dec. 3, 2021, which claims the benefit of U.S. Provisional Application No. 63/147,134, filed Feb. 8, 2021. The '333 and '134 Applications are herein incorporated by reference in their entirety.

TECHNICAL FIELD

This disclosure relates to an assembly configured to cover a barbecue grill. This disclosure also relates to a method of using the assembly.

BACKGROUND

A barbecue grill or barbeque grill (commonly referred to in abbreviated form as a "grill," a "barbecue," or "barbie" depending, most typically, on geographic region) is a device that cooks food by applying heat from below. There are several varieties of grills, including gas-fueled, charcoal, or electric.

Most grills are used and stored outside. As such, most grill owners use a grill cover to protect the grill from the elements. A grill cover is a textile product specially designed to fit over a grill so as to protect the grill from outdoor elements such as sun, wind, rain and snow, and outdoor contaminants such as dust, pollution, and bird droppings. Grill covers are known to be made with a vinyl outer shell and a heat-resistant inner lining. Known grill covers include adjustable straps to secure the cover in windy conditions.

SUMMARY

In some aspects, the techniques described herein relate to an assembly configured to cover a barbecue grill, including a cover including an upper section and a lower section, wherein the upper section is configured to selectively cover and uncover a hood of the barbecue grill, wherein an inner surface of the upper section includes a loop; a stand including a hook, wherein the hook is configured to hold the loop such that the stand supports the upper section.

In a further embodiment, the hook is arranged rearward of the barbecue grill.

In a further embodiment, the stand is free-standing such that the stand is able to remain vertically upright without being supported by the barbecue grill.

In a further embodiment, the stand includes a front section and a rear section, the front section includes first and second columns projecting upward from a base, the rear section includes a central column projecting upward from a base, the central column is spaced-apart rearward of the first and second columns, the central column extends above the first and second columns, the central column includes the hook.

In a further embodiment, the hook is a first hook of the stand, the first hook projects toward the barbecue grill, the first and second columns including second and third hooks, respectively, projecting from the first and second columns in laterally opposite directions.

In a further embodiment, the lower section of the cover includes first and second flaps, the first and second flaps each include a loop, the first and second flaps are foldable such that the second and third hooks are configured to hold a respective one of the loops of the first and second flaps.

In a further embodiment, when the loop is on the hook, the upper section hangs between the front section of the stand and the rear section of the stand.

In a further embodiment, the lower section of the cover includes a central portion and first and second flaps projecting from opposite sides of the central portion.

In a further embodiment, the central portion includes a sleeve receiving the front section of the stand.

In a further embodiment, the upper section of the cover is foldable relative to a hood of a grill.

In a further embodiment, a first side of the upper section includes a first fastener, and a second side of the upper section opposite the first side includes a second fastener configured to mate with the first fastener.

In a further embodiment, the first and second flaps are configured to wrap around shelves of the barbecue grill and, adjacent free ends thereof, fasten together in a front of the barbecue grill.

In a further embodiment, the upper section of the cover is foldable while the first and second flaps are fastened together in the front of the barbecue grill.

In some aspects, the techniques described herein relate to a barbecue grill assembly, including a barbecue grill including shelving, side trays, and a hood; a cover including an upper section and a lower section, wherein the upper section is configured to selectively cover and uncover the side trays and the hood, wherein the lower section is configured to selectively cover and uncover the shelving, and wherein the upper section includes a loop; and a stand including a hook, wherein the hook is configured to hold the loop such that the stand supports the upper section.

In a further embodiment, an inner surface of the upper section includes the loop.

In a further embodiment, the stand is free-standing such that the stand is able to remain vertically upright without being supported by the barbecue grill.

In a further embodiment, the stand is arranged behind the barbecue grill.

In some aspects, the techniques described herein relate to a method, including folding an upper section of a cover for a barbecue grill to expose a loop; and placing the loop on a hook of a stand such that the upper section of the cover hangs rearward of the barbecue grill.

In a further embodiment, the hook is arranged rearward of the barbecue grill, the stand is free-standing such that the stand is able to remain vertically upright without being supported by the barbecue grill, and the upper section of the cover hangs rearward of the barbecue grill.

In a further embodiment, the method includes placing a lower section of the cover over a section of the stand; and wrapping the lower section around shelving of the barbecue grill, wherein the folding step and the step of placing the loop on the hook are completed without moving the lower section relative to the stand or the barbecue grill.

DETAILED DESCRIPTION

Figure 1:
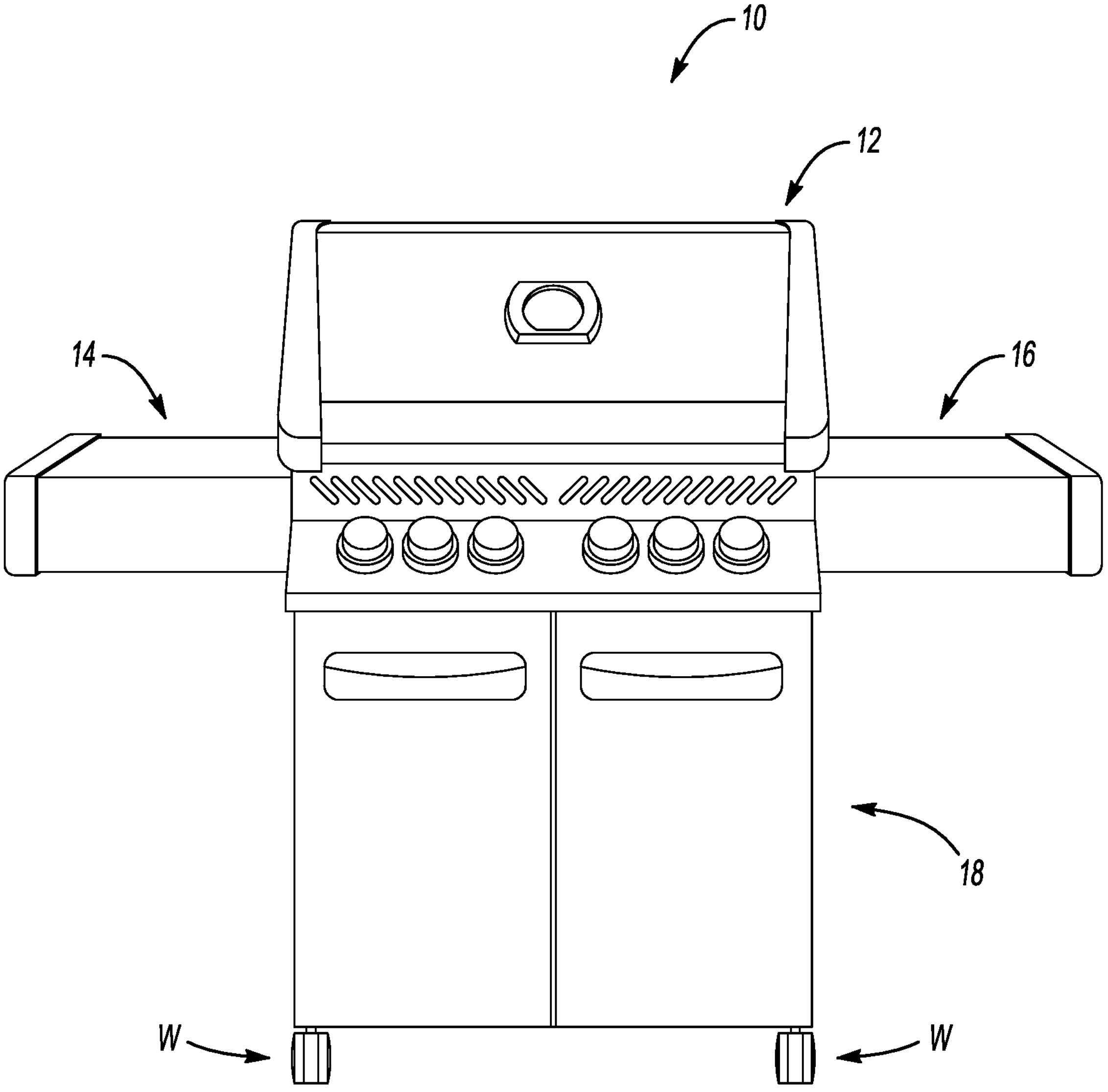
FIG. 1 illustrates and example barbecue grill.

FIG. 1 illustrates and example barbecue grill 10 ("grill 10"). The barbecue grill 10 will be referred to as a "grill" herein. Barbecue grills may be referred to in abbreviated form as grills, barbecues, barbies, etc., depending mostly on geographic region. The term "grill" is used herein as being inclusive of each of these terms and as encompassing any device that cooks food by applying heat from below, including gas-fueled, charcoal, or electric grills.

The grill 10 includes a hood 12, side trays 14, 16, and cabinets 18. The grill 10 does not include side trays 14, 16 or cabinets 18 in all examples. The side trays 14, 16 may include burners. The grill 10 could include one side tray in some examples. In this example, the grill 10 includes wheels W that connect a bottom of the cabinets to a floor surface, such as a patio, deck, or other ground surface. In other examples, the wheels W can be replaced by static supports.

The grill 10 is typically used and stored outdoors. This disclosure relates to a grill cover assembly 20 configured to protect the grill 10 from the elements, thereby prolonging the useful life of the grill 10.

Figure 2:
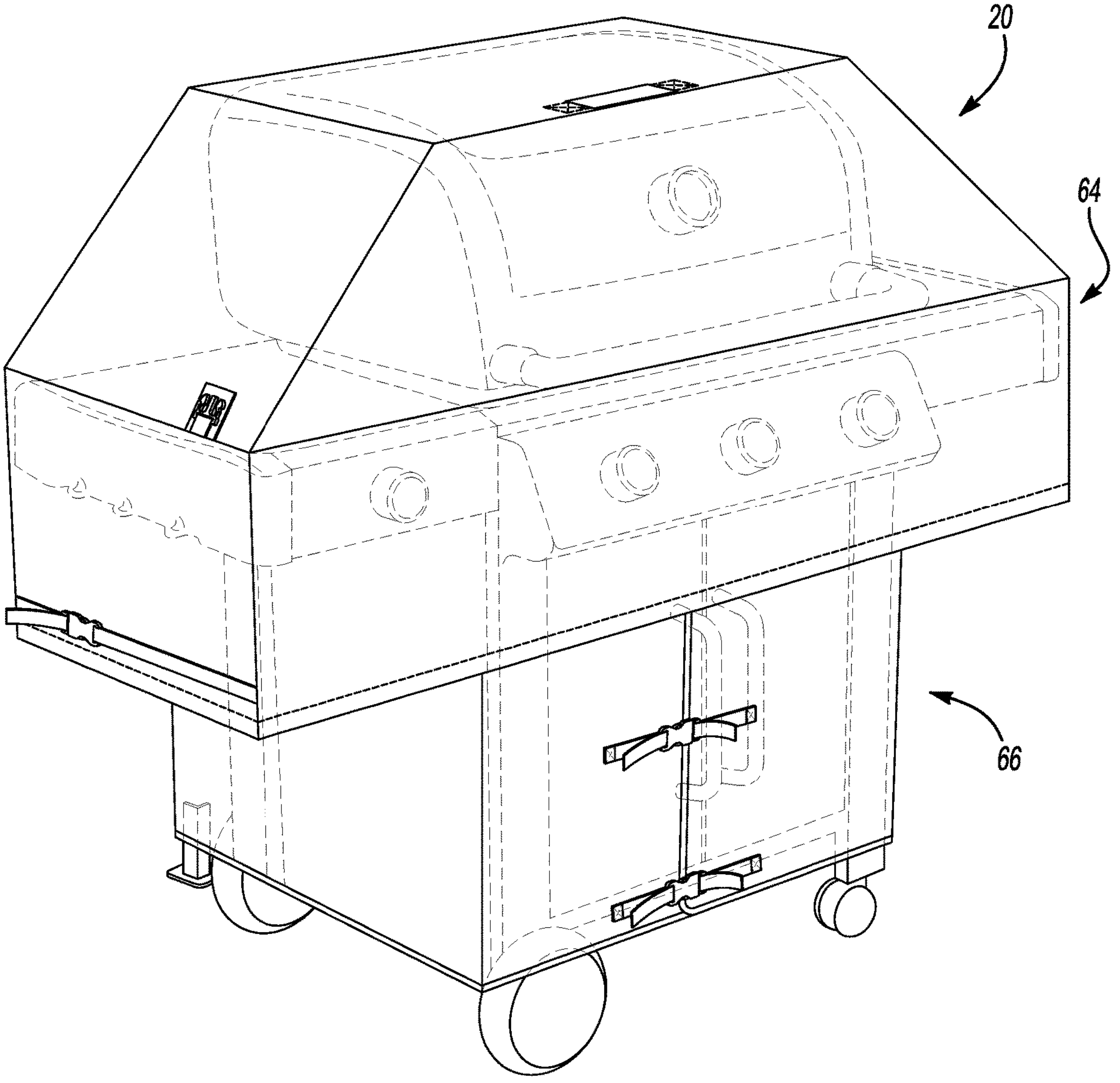
FIG. 2 is a front perspective view of an example cover assembly.
Figure 3:
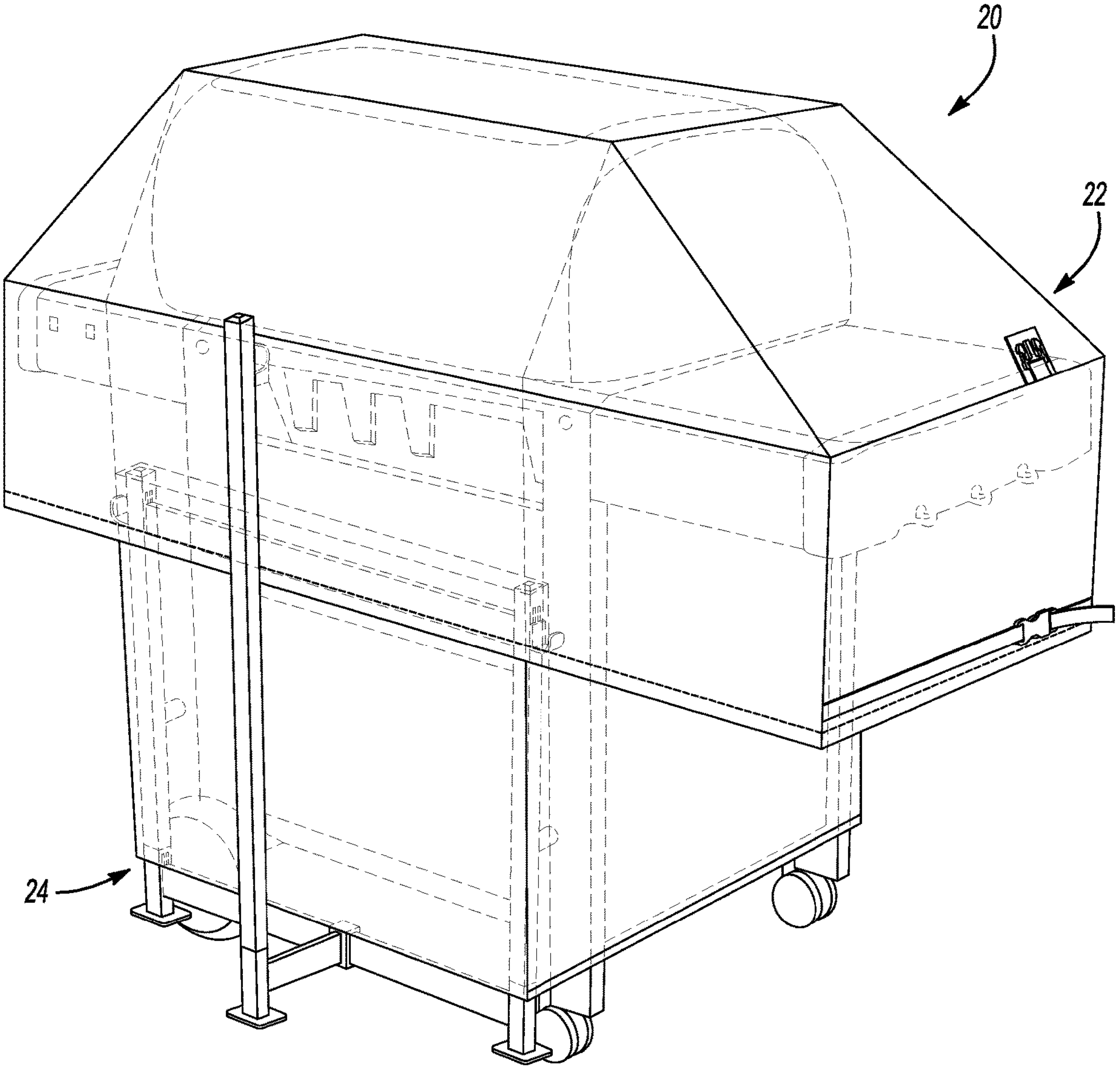
FIG. 3 is a rear perspective view of the example cover assembly.

An example grill cover assembly 20 is shown in FIGS. 2 and 3. The grill cover assembly 20 includes a cover 22 and a stand 24.

Figure 4:
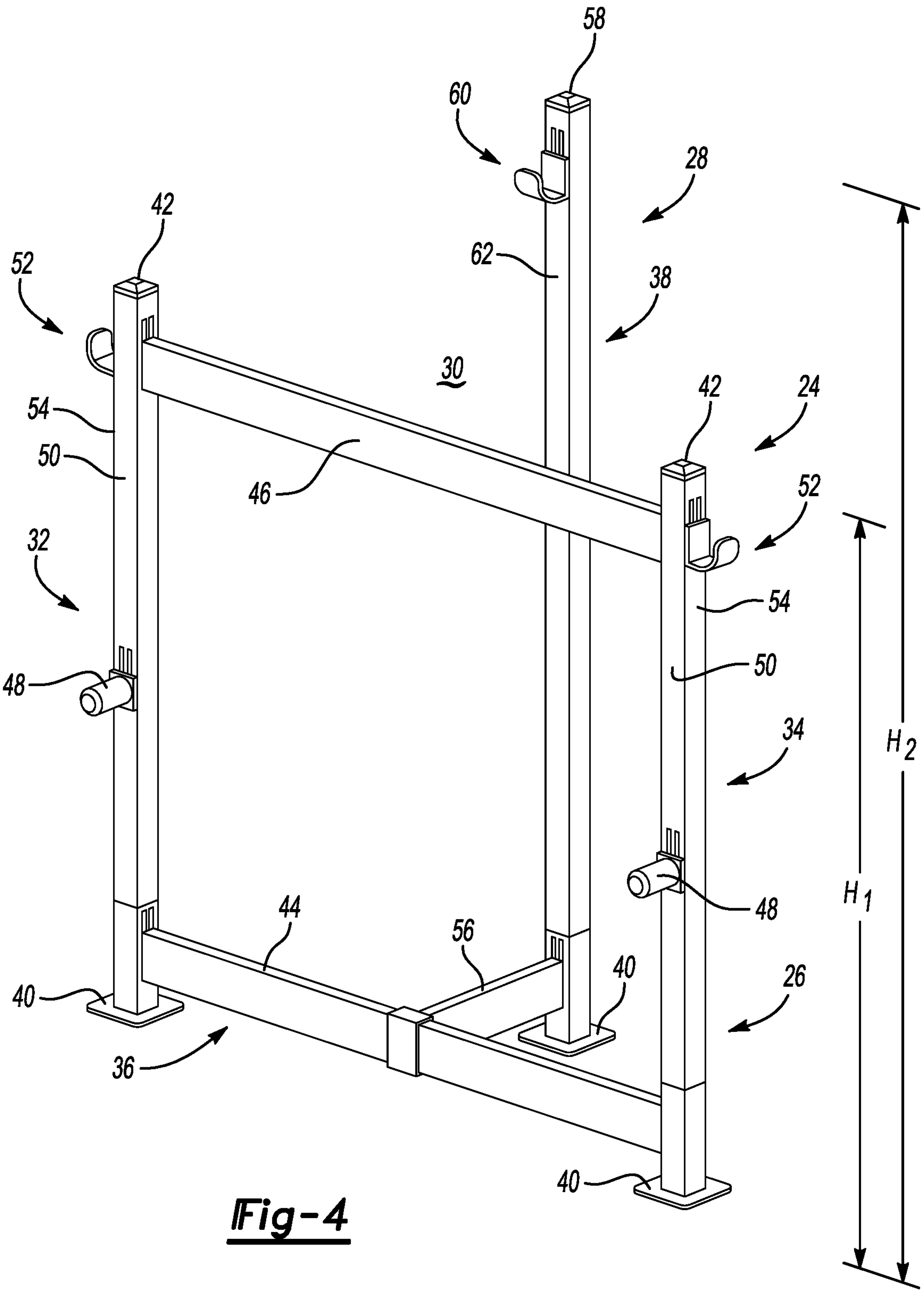
FIG. 4 is a perspective view of an example stand.

The stand 24 is shown in more detail in FIG. 4. The stand 24 includes a front section 26 and a rear section 28. The front section 26 is closer to a rear of the grill 10 than the rear section 28. The front and rear sections 26, 28 are spaced-apart by a gap 30.

In this example, the front section 26 includes first and second columns 32, 34 projecting upward from a base 36, which is a lower section of the stand 24 including portions of the stand 24 that are able to contact a ground surface. The rear section 28 includes a third, central column 38 projecting upward from the base 36.

The stand 24 is free-standing, meaning it is able to remain vertically upright without being supported by the grill 10. In this regard, the base 36 includes feet 40 configured to directly contact a ground surface, including a patio, deck, pavement, floor, grass, etc. The base 36 includes three feet 40, one arranged beneath each of the columns 32, 34, 38. The feet 40 exhibit a greater surface area than the cross-section of the columns 32, 34, 38. In some examples, the base 36 is sufficiently stable and balanced without adding weights or stakes. In other examples, the base 36 may be anchored to the ground surface using weights or stakes. Weights or stakes, as examples, could interface with the feet 40. If weights or stakes are used, the stand 24 would still be considered free-standing because it is able to stand independent of the grill 10.

The front section 26 is slightly shorter than the rear section 28 in this example. Specifically, the first and second columns 32, 34 project a distance Hi above the base 36, namely the bottom of the feet 40, to top ends 42. For stability, the first and second columns 32, 34 are connected by a lower cross-bar 44 adjacent the base 36 and an upper cross-bar 46 adjacent the top ends 42.

At a point about midway between the base 36 and the top ends 42, each of the first and second columns 32, 34 includes a spacer 48 projecting forward from a front face 50 thereof. The spacers 48 keep the stand 24 spaced from a rear of the grill 10 and thus limit heat transfer between the grill 10 and the stand 24.

Adjacent the top ends 42, each of the first and second columns 32, 34 includes a hook 52 projecting laterally outward from a laterally outward face 54 of a respective one of the columns 32, 34. The term laterally outward refers to a direction that faces outward, away from the center of the stand 24. The laterally outward direction, relative to the first column 32 is in the left-hand direction with reference to FIG. 4. Relative to the second column 34, the laterally outward direction is in the right-hand direction with reference to FIG. 4.

The third column 38 is connected to the front section 26 by a support 56, which is connected at about a midpoint of the cross-bar 44. The third column 38 extends a height $H_2$ from the base 36 to a top end 58. The height $H_2$ is greater than the height $H_1$. In an example, the height $H_1$ is about 30% greater than the height $H_2$. Adjacent the top end 58, the third column 38 includes a hook 60 projecting forward from a front face 62 of the third column 38. The hook 60 is located above the top ends 42.

With reference to FIG. 2, the cover 22 includes an upper section 64 and a lower section 66 below the upper section 64. The upper section 64 is generally concave (from the perspective of the grill 10) and is configured to selectively cover and uncover the hood 12 and any side trays 14, 16 of the grill 10. The lower section 66 is configured to cover the parts of the grill 10 below the hood 12 and side trays 14, 16, such as cabinets 18. The upper section 64 is sized and shaped to correspond to common hood 12 and side tray 14, 16 sizes, and the lower section 66 is sized and shaped to correspond to common cabinet 18 sizes. The upper and lower sections 64, 66 may be cinchable in some examples to accommodate different grill sizes. The upper and lower sections 64, 66 may be provided as a double-layer of material, with the outer layer being a material configured to resist wear from the elements and an inner layer being heat reflective or heat resistive. Other arrangements of materials, and their layering, come within the scope of this disclosure.

Figure 5:
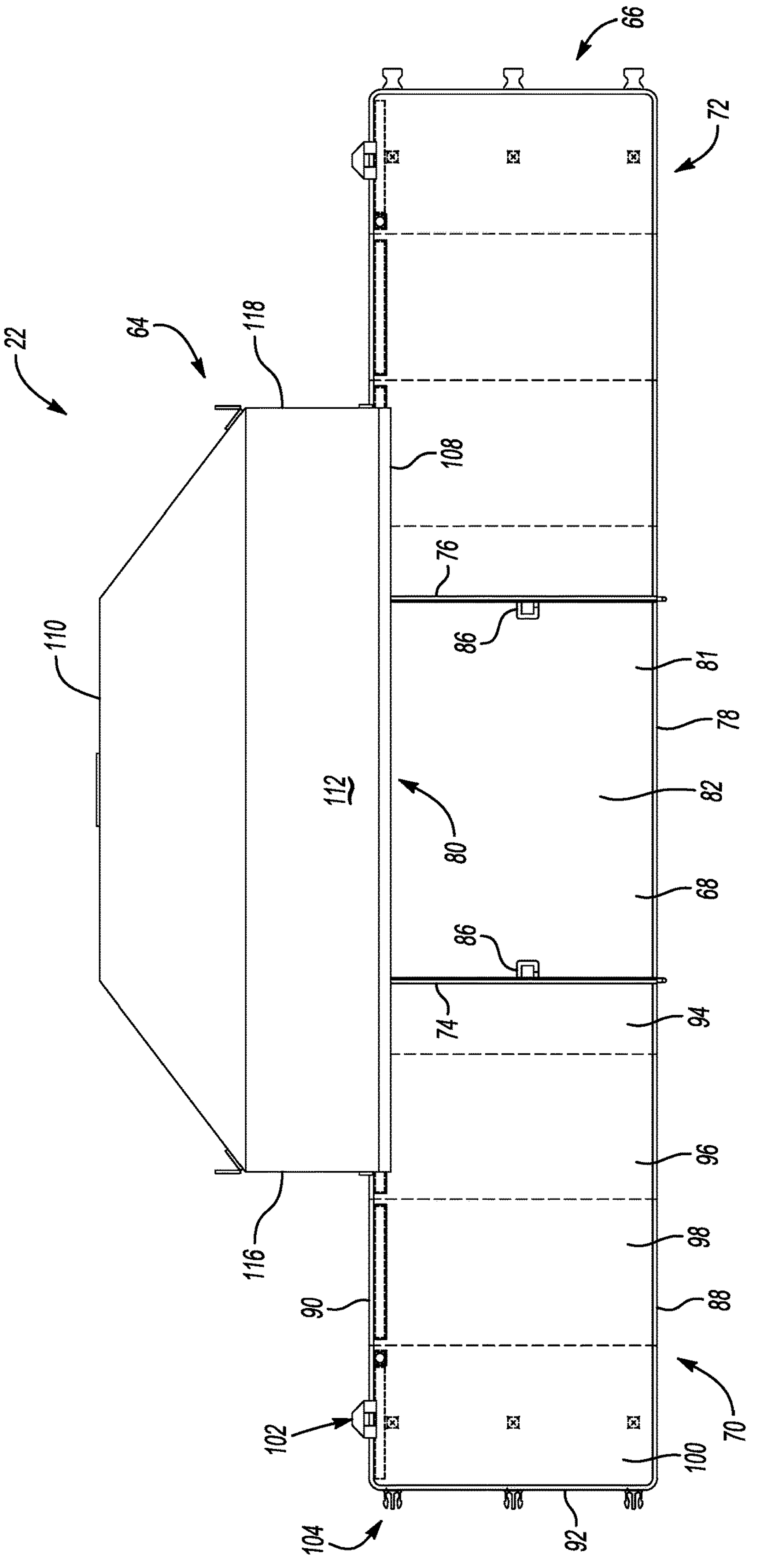
FIG. 5 is a front view of an example cover.

The lower section 66 is configured to wrap around the cabinets 18, in one example. The lower section 66 includes a central portion 68 and laterally first and second flaps 70, 72 projecting from opposite sides 74, 76 of the central portion 68, as shown in FIG. 5.

Figure 6:
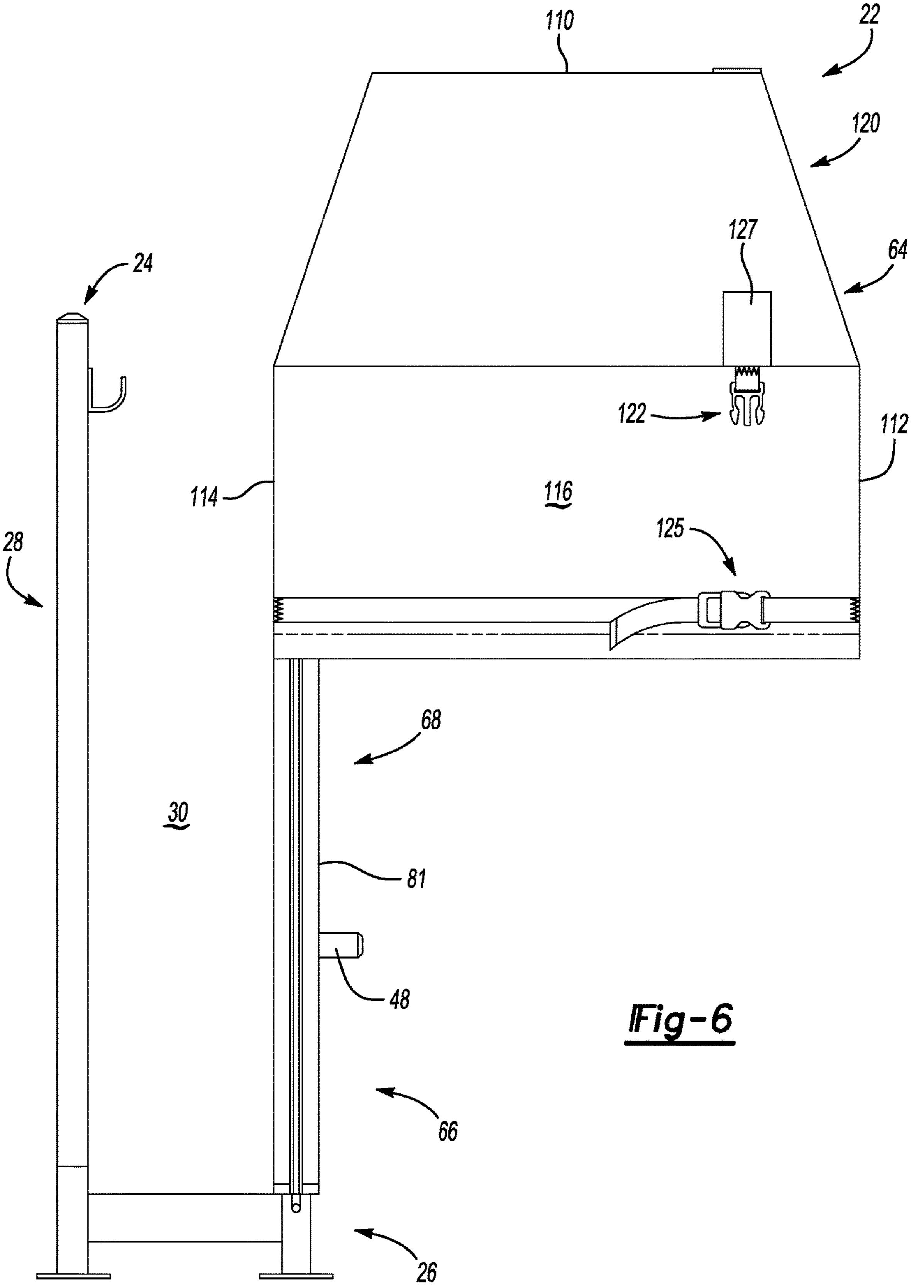
FIG. 6 is a side view of the example cover assembly.

The central portion 68 extends between sides 74, 76 from a bottom edge 78 to a top edge 80. An inner surface 81 of the central portion 68 exhibits a heat resistant panel 82 facing in the forward direction, toward the grill 10. The central portion 68 is open adjacent its bottom edge 78 and defines a sleeve configured to fit over and receive the front section 26 of the stand 24. As shown in FIG. 6, and with continued reference to FIG. 5, the central portion 68 fits over the front section 26 such that the first column 32 and second column 34 are enclosed laterally within the sides 74, 76. The inner surface 81 includes two cutouts 86 for the spacers 48 to project therethrough. Further, the central portion 68 does not cover the hooks 52 such that the hooks 52 are exposed and project laterally outward beyond the central portion 68. The bottom edge 78 may include a notch to accommodate support 56.

The first and second flaps 70, 72 are essentially mirror images of one another about the central portion 68, and thus only the first flap 70 will be described in detail. The first flap 70 exhibits a height between a bottom edge 88 and a top edge 90 and extends laterally from the side 74 to a free end 92. The first flap 70 includes a plurality of sections 94, 96, 98, 100 arranged from the side 74 to the free end 92. Each section 94, 96, 98, 100 includes a heat resistive panel on an inner surface thereof. As such panels may be inflexible, the sections 94, 96, 98, 100 are foldable in an accordion-like manner along vertical seams bordering each of the sections 94, 96, 98, 100. Because the upper section 64 includes heat-resistive paneling on an inner surface thereof, the upper section 64 can cover the cabinets 18 while the grill 10 is in use.

The section 100 including the free end 92, in this example, includes a loop 102 projecting upward from the top edge 90 and one or more fasteners 104 projecting laterally from the free end 92.

The loop 102 is provided by a strip of fabric and, together with the top edge 90, provides an enclosed space. The loop 102 may be referred to as a hanging loop, similar to hanging loops common to the neckline of jackets and coats. When the sections 94, 96, 98, 100 are folded, the loop 102 can be hung on the hook 52 of the first column 32. A similar loop on the flap 72 likewise hangs from hook 52 of the second column 34.

The fasteners 104 may be any known type of fastener such as buckles, clips, clasps, etc., and are configured to interface with similar fasteners projecting from the free end of the second flap 72. The free ends of the flaps 70, 72 meet in the center of the front of the grill 10.

Figure 7:
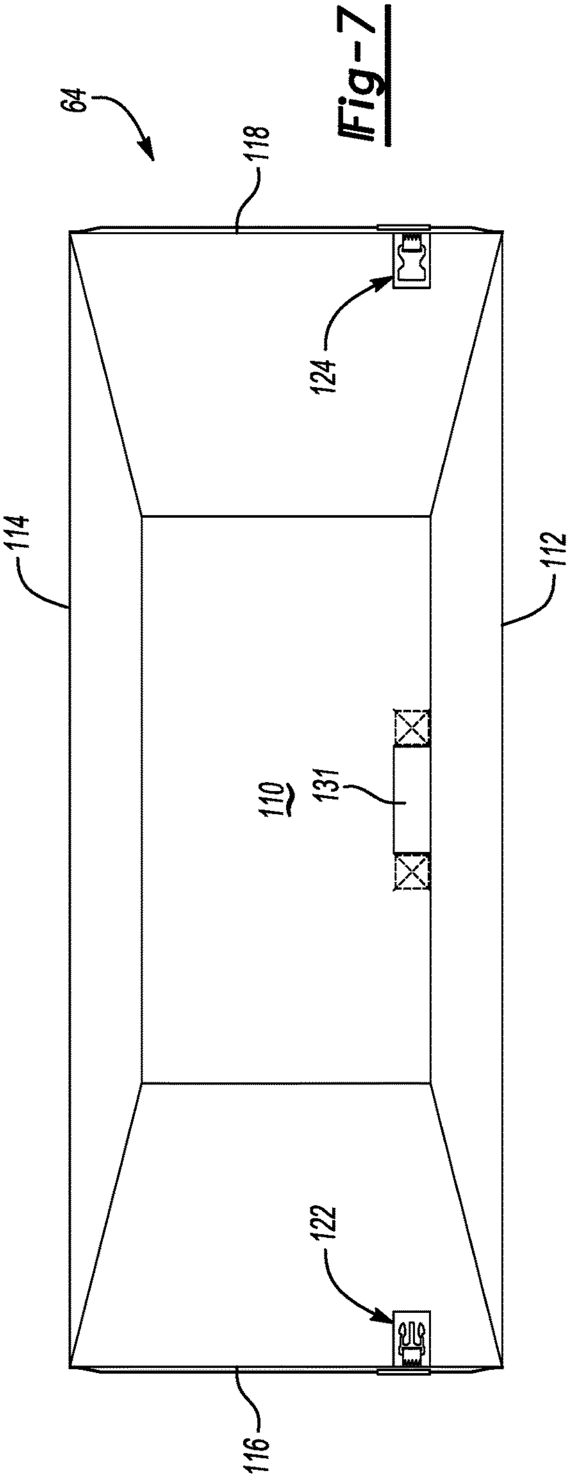
FIG. 7 is a top view of an upper section of the cover.

With joint reference to FIGS. 5-7, the upper section 64 exhibits a height between a bottom edge 108 and a top panel 110. Beginning at the bottom edge 108 and moving upward, the upper section 64 includes a front panel 112, a rear panel 114, and side panels 116, 118 extending between the front and rear panels 112, 114. The top panel 110 is spaced-apart from the panels 112, 114, 116, 118 by an angled section 120 extending vertically, at a non-zero angle relative to the upward and downward directions, between the panels 112, 114, 116, 118 and the top panel 110, which extends perpendicular to the upward and downward directions.

Adjacent an intersection of the side panel 116 and the angled section 120, the upper section 64 includes a first fastener 122. A second fastener 124 configured to interface with the first fastener 122 is arranged adjacent an intersection of the side panel 118 and the angled section 120. Adjacent the first and second fasteners 122, 124 are hook-and-loop fasteners 127 (one of which is shown in FIG. 6), which are configured for attachment to corresponding hook-and-loop fasteners 131 on the top of the top panel 110. Hook-and-loop fasteners 127, 131 hold the side panels 116, 118 to the top panel 110, while the fasteners 122, 124 hold the side panels 116, 118 to one another. The hook-and-loop fasteners 127, 131 may be exchanged with another type of fastener, such as clasps, configured to hold the side panels 116, 118 to the top panel 110, and are not limited to hook-and-loop. Further, the side panels 116, 118 may be cinchable by straps 125, one of which is shown in FIG. 6, to accommodate different size grills 10 including those that exclude one or more side trays 14, 16.

Figure 8:
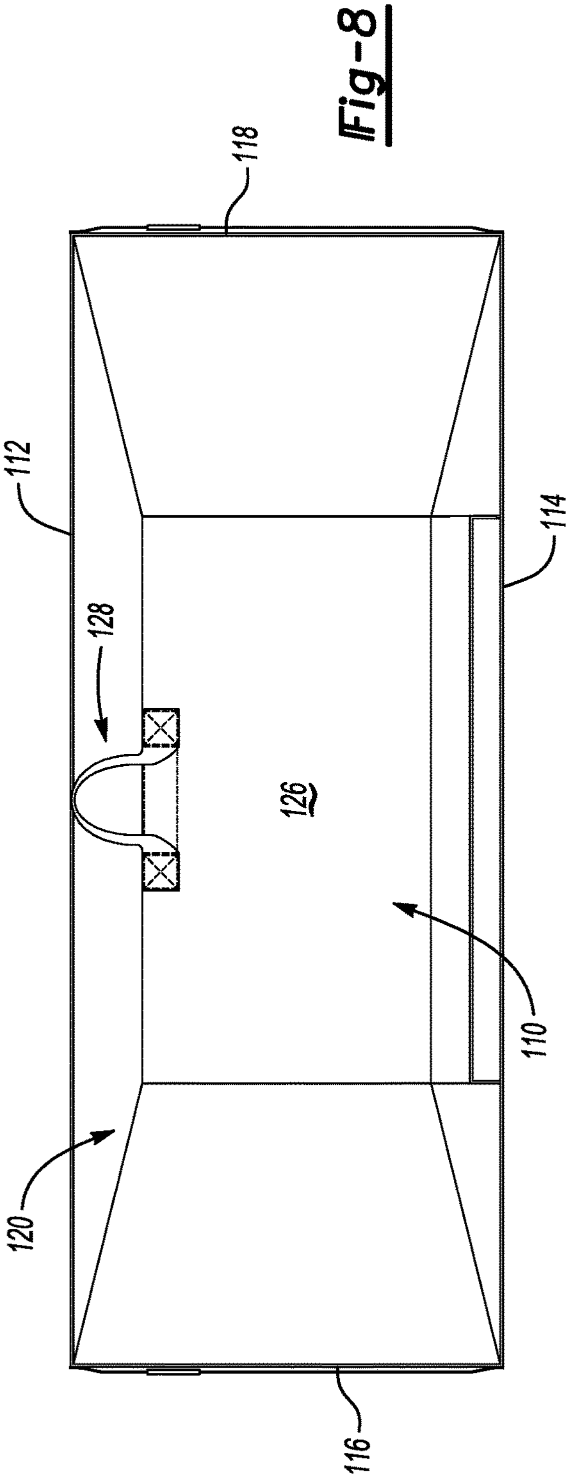
FIG. 8 is a bottom view of the upper section of the cover.

With reference to FIG. 8, an inner surface 126 of the top panel 110, which faces the grill 10, includes a heat-resistive panel. Further, adjacent a front edge of the inner surface 126 and a top of the angled section 120, the upper section 64 includes a loop 128. The loop 128 is provided by a strip of fabric. Together with the inner surface 126, the loop 128 encloses an opening. The loop 128 may be referred to as a hanging loop. The upper section 64 is foldable to expose the loop 128 such that the loop 128 can hang from the hook 60 such that the stand 24 supports the upper section 64.

Figure 9A:
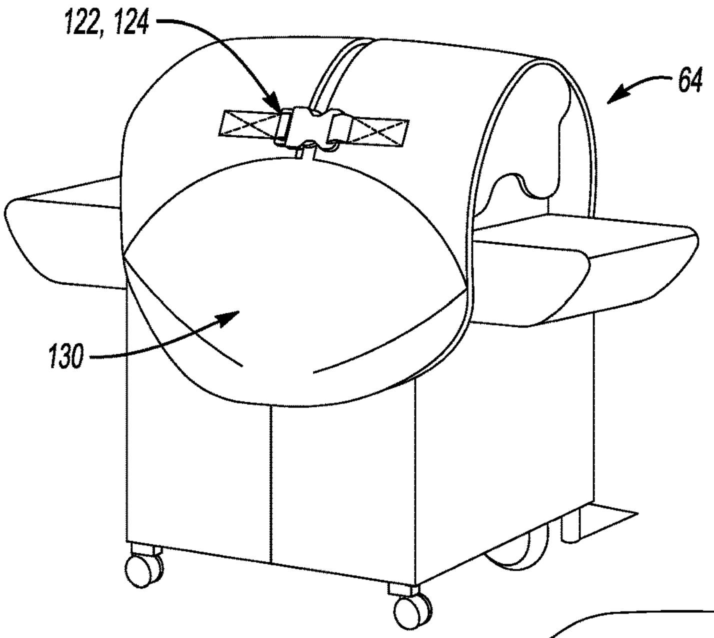
FIG. 9A is a view of the upper section of the cover with side fasteners fastened together.
Figure 9B:
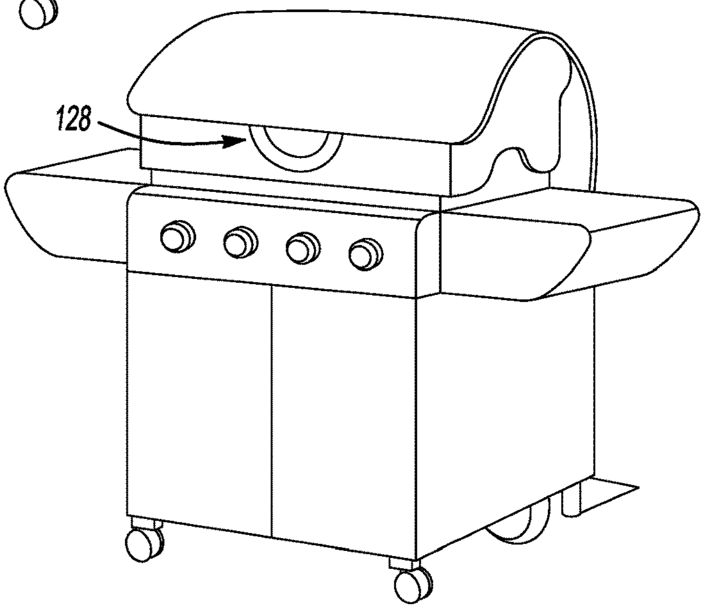
FIG. 9B is a view of the upper section of the cover folded to expose a loop.
Figure 9C:
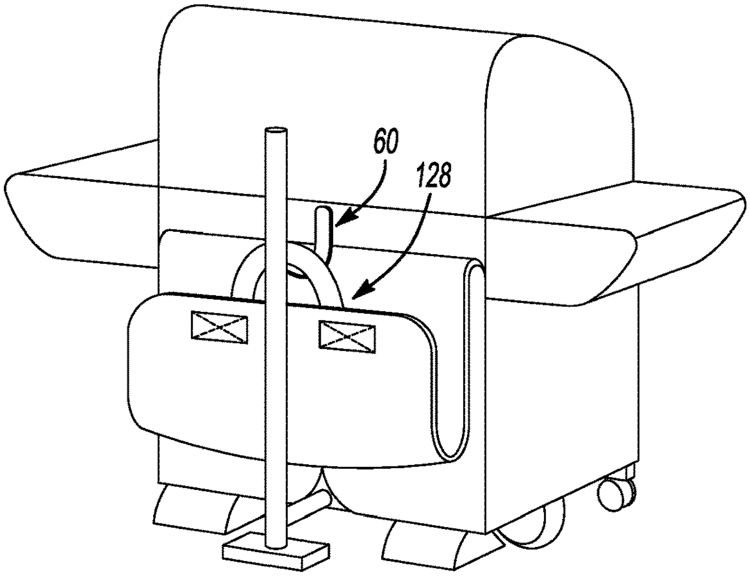
FIG. 9C is a view of the upper section of the cover with the loop on a hook of the stand.

FIGS. 9A-9C illustrate an exemplary manner of use. In FIG. 9A, the upper section 64 is folded, the hook-and-loop fasteners 127, 131 are attached to one another, and the fasteners 122, 124 are clipped together. Material at 130 is folded rearwardly to expose loop 128, as shown in FIG. 9B. Then, upper section 64 is rotated rearwardly, generally about the upper edge 80, and the loop 128 is placed on hook 60, as shown in FIG. 9C. In the position of FIG. 9C, the upper section 64 fits within the gap 30 between the front and rear sections 26, 28 of the stand 24. Further, the hook 60 holds the upper section 64 above the ground surface. Thus, the upper section 64 is insulated from heat and is protected from wear that may have been caused by interaction with a ground surface or other surface. The grill 10 can be used in the configuration of FIG. 9C. There is no need to remove the lower section 66 of the cover 22 when using the grill 10. However, if desired, the flaps 70, 72 can be hung from the hooks 52 during use of the grill 10, as described above.

Figure 10:
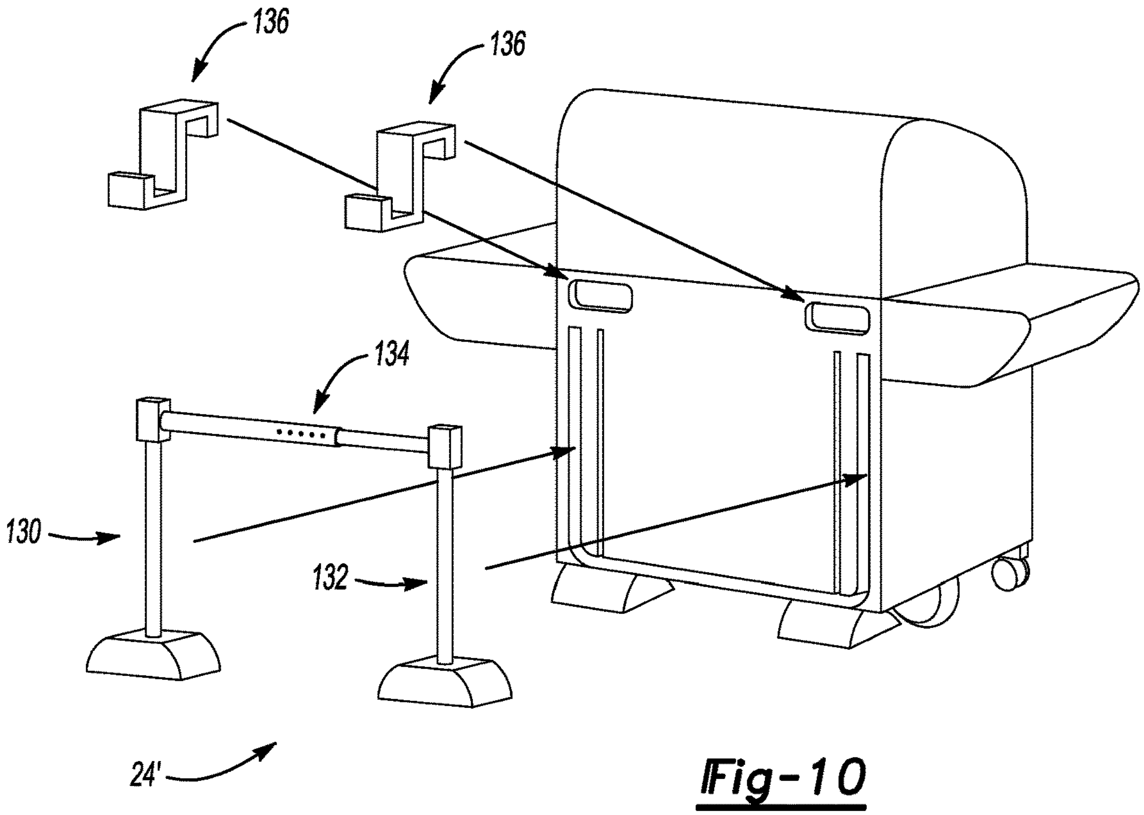
FIG. 10 is an exploded view of various components of an alternate cover assembly from a rear perspective.

Another aspect of this disclosure relates to adjustability of the stand 24 to accommodate different grill sizes. In FIG. 10, a stand 24' includes two columns 130, 132 and one cross-bar 134. The cross-bar 134 is expandable, and selectively lockable, such that the space between the columns 130, 132 is adjustable. With respect to FIG. 4, the cross-bars 44, 46 or support 56 could be expandable in the same manner.

Figure 11:
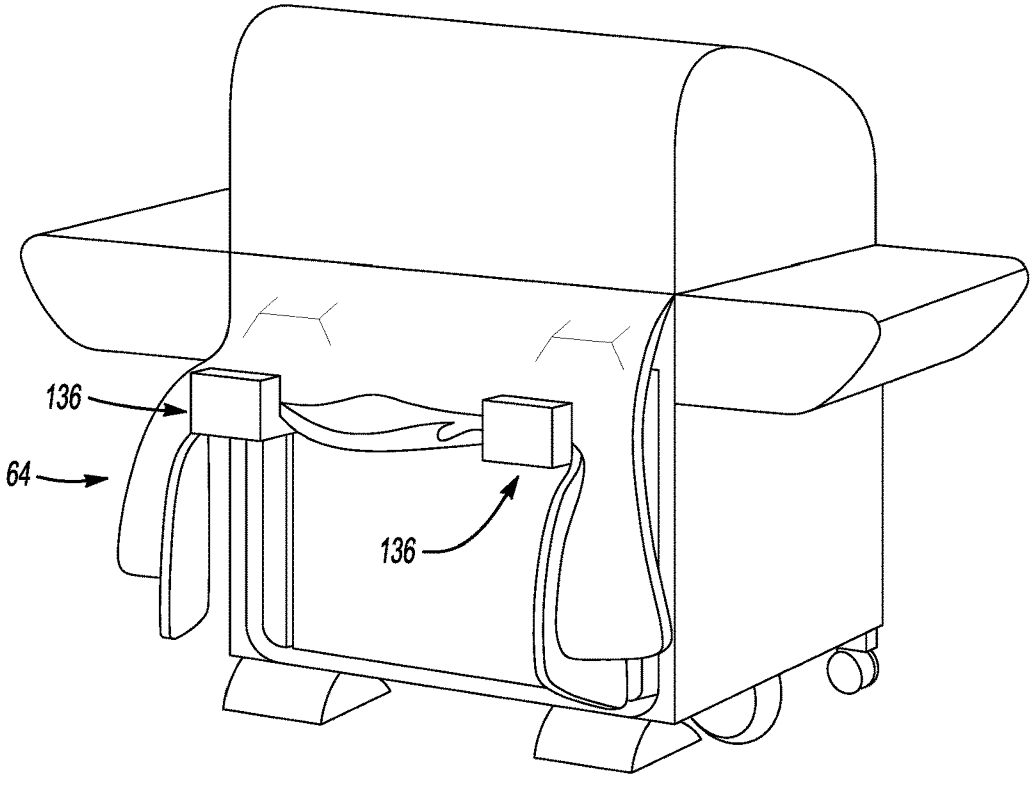
FIG. 11 is a rear perspective view of the alternate cover assembly of FIG. 10, with the stand holding an upper section of a grill cover.

Another optional embodiment of this disclosure replaces the third, central column 38 of FIG. 4 with one or more hooks. In FIG. 10, two hooks 136 are attached to the cross-bar 134 and project rearward, away from a grill, and are able to hold the upper section 64 of the cover 22, as shown in FIG. 11.

It should be understood that directional terms such as "upper," "lower," "front," "rearward," etc., are used above with reference to the normal operational attitude of the grill and the cover. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly configured to cover a cooking device, comprising:

a cover including an upper section and a lower section, wherein the upper section is configured to selectively cover and uncover a hood of the cooking device when the upper section is in an unfolded configuration, wherein an inner surface of the upper section includes a loop, wherein the upper section is foldable between the unfolded configuration and a folded configuration in which the loop is exposed, and wherein, when the upper section is in the unfolded configuration, the loop is not exposed; and a stand including a hook, wherein, when the upper section is folded into the folded configuration, the hook is configured to hold the loop such that the stand supports the upper section, wherein the stand is free-standing such that the stand is separate from a support structure of the cooking device, and such that the stand is able to remain vertically upright without being supported by the cooking device or the support structure of the cooking device, wherein, when the upper section is folded into the folded configuration and the loop is held by the hook, at least a portion of the cover remains attached to the cooking device, and wherein, when the upper section is folded into the folded configuration and the loop is held by the hook, the upper section of the cover is rearward of the cooking device.

2. The assembly as recited in claim 1, wherein, when the loop is held by the hook, the lower section of the cover is wrapped around a bottom portion of the cooking device.

3. The assembly as recited in claim 1, wherein the hook is arranged rearward of the cooking device.

4. The assembly as recited in claim 1, wherein:

the stand includes a front section and a rear section, the front section includes first and second columns projecting upward from a base, the rear section includes a central column projecting upward from a base, the central column is spaced-apart rearward of the first and second columns, the central column extends above the first and second columns, the central column includes the hook.

5. The assembly as recited in claim 4, wherein:

the hook is a first hook of the stand, the first hook projects toward the cooking device, and the first and second columns including second and third hooks, respectively, projecting from the first and second columns in laterally opposite directions.

6. The assembly as recited in claim 5, wherein:

the lower section of the cover includes first and second flaps, the first and second flaps each include a loop, and the first and second flaps are foldable such that the second and third hooks are configured to hold a respective one of the loops of the first and second flaps.

7. The assembly as recited in claim 6, wherein, when the loop is on the hook, the upper section hangs between the front section of the stand and the rear section of the stand.

8. The assembly as recited in claim 6, wherein the cover includes a central portion and first and second flaps projecting from opposite sides of the central portion.

9. The assembly as recited in claim 8, wherein the central portion includes a sleeve receiving the front section of the stand.

10. The assembly as recited in claim 9, wherein the upper section of the cover is foldable relative to a hood of a grill.

11. The assembly as recited in claim 10, wherein:

a first side of the upper section includes a first fastener, and a second side of the upper section opposite the first side includes a second fastener configured to mate with the first fastener.

12. The assembly as recited in claim 9, wherein the first and second flaps are configured to wrap around shelves of the cooking device and, adjacent free ends thereof, fasten together in a front of the cooking device.

13. The assembly as recited in claim 12, wherein the upper section of the cover is foldable while the first and second flaps are fastened together in the front of the cooking device.

14. The assembly as recited in claim 1, wherein the cooking device is a barbecue grill.

15. The assembly as recited in claim 1, wherein, when the upper section is in the unfolded configuration and when the cover is covering the hood of the cooking device, the inner surface of the upper section faces the cooking device.

16. The assembly as recited in claim 1, wherein when the upper section is configured such that, when moving from the unfolded configuration to the folded configuration, two opposed portions of the upper section are foldable toward one another in a first direction and then another portion of the upper section is foldable in a second direction perpendicular to the first direction, at which point the loop becomes exposed.

17. The assembly as recited in claim 2, wherein the lower section includes heat-resistant material.

* * * * *